United States Patent [19]

Kitaura et al.

[11] Patent Number: 4,512,646
[45] Date of Patent: Apr. 23, 1985

[54] ACOUSTIC INDICATING DEVICE FOR CAMERAS

[75] Inventors: Mashio Kitaura, Tondabayashi; Norio Ishikawa, Osaka; Toshihiko Ishimura, Habikino, all of Japan

[73] Assignee: Minolta Camera Kabushiki Kaisha, Osaka, Japan

[21] Appl. No.: 580,313

[22] Filed: Feb. 15, 1984

[30] Foreign Application Priority Data

Feb. 25, 1983 [JP] Japan ............................. 58-27593[U]

[51] Int. Cl.³ ............................................. G03B 3/00
[52] U.S. Cl. ..................................... 354/409; 354/467
[58] Field of Search .................... 354/409, 467, 195.13

[56] References Cited

U.S. PATENT DOCUMENTS

| | | | |
|---|---|---|---|
| 4,329,032 | 5/1982 | Aoki et al. | 354/409 |
| 4,361,390 | 11/1982 | Yamada | 354/409 |
| 4,367,933 | 1/1983 | Sahara | 354/467 |
| 4,443,086 | 4/1984 | Hosoe et al. | 354/409 |
| 4,466,726 | 8/1984 | Nakajima | 354/409 |

FOREIGN PATENT DOCUMENTS 58-532  4/1983  Japan .................................. 354/467

Primary Examiner—Russell E. Adams
Attorney, Agent, or Firm—Wolder, Gross & Yavner

[57] ABSTRACT

A camera acoustic indicating device for indicating, by sound, attainment of an in-focus condition of a camera objective lens and warning possibility of a blur occuring exposure time due to low brightness of an object to be photographed. The sound for the in-focus indication is intermittently generated at a frequency higher than that at which the sound for the blur warning is intermittently generated. When the attainment of an in-focus condition is detected while the blur warning is being made, the warning is interrupted for a given time period during which the attainment of the in-focus condition is indicated for a short time.

9 Claims, 3 Drawing Figures

ACOUSTIC INDICATING DEVICE FOR CAMERAS

BACKGROUND OF THE INVENTION

1. Field of the Invention

The present invention relates to an acoustic indicating device for a camera, which device makes an indication by a sound when the camera objective lens has just been focused on a desired object and when the brightness of the object is within a low brightness range which will cause blur occuring shutter speeds.

2. Description of the Prior Art

An acoustic focus condition indicating device has been proposed which makes a sound for a short time to acoustically indicate the attainment of an in-focus condition when a camera objective lens has reached an in-focus position. A blur warning device has also been proposed which makes a sound to warn the possibility of blur occuring when the brightness of an object is comparatively low to require a long or slow shutter speed, e.g. one longer than 1/60 second, that will cause blur in the picture taken with that shutter speed due to shaking of the camera hand-held by the user.

When it is desired that both the attainment of an in-focus condition and the blur warning are indicated by sound, following conditions are required for such indication. First, the indication must be made in the manner that the user can easily identify which of the in-focus condition and the blur warning is being indicated. Further, as the in-focus condition and the blur warning are information of photographic conditions that are independent of each other, it sometimes occurs that both the attainment of an in-focus condition and the blur warning are to be indicated concurrently but in such a manner that one can distinguish which is which. Additionally, the attainment of an in-focus condition should be indicated quickly when such a condition has been attained. To satisfy such conditions, it may be considered that an in-focus condition indicating device and a blur warning device are provided independently of each other with the devices being arranged to make sound of different frequency, volume, tone or the like. In this case, however, two indicating devices must be provided in and/or on a camera, resulting in the bulkiness and complexity of the camera. Hence, the provision of two independent acoustic indicating devices is not practical.

SUMMARY OF THE INVENTION

An object of the present invention is to provide a a camera acoustic indicating device which indicates the attainment of an in-focus condition and the blur occuring exposure time by means of a single acoustic member and which enables the user to easily identify which indication is being made.

Another object of the present invention is to provice an acoustic indicating device which, when both the attainment of an in-focus condition and the blur warning are to be indicated concurrently, e.g. when an in-focus condition has been attained while blur warning is being made, makes an in-focus indicating sound that enables the user to recognize the attainment of an in-focus condition promptly and impressively.

To attain the above objects, the present invention is arranged such that, when an in-focus condition has been reached or attained while a blur occuring exposure time is being warned, the generation of the blur warning sound is suspended for a given time period. In the invention, the sound for indicating the attainment of an in-focus condition is generated intermittently at a period shorter than that at which the blur warning sound is generated intermittently. In other words, the frequency of the intermittence of the in-focus indicating sound is higher than that of the blur warning. Additionally, the period of the suspension of the blur warning sound is longer than the period of the intermittence of the sound generation for indicating attainment of an in-focus condition. Thus, the attainment of an in-focus condition is indicated promptly and impressively without being confused with the blur warning even while the latter is being indicated whereby the user can clearly recognize the attainment of the in-focus condition.

The above and other objects and features of the invention will appear more fully herein after from a consideration of the following description taken in connection with the accompanying drawings wherein one example is illustrated.

DETAILED DESCRIPTION OF THE PREFERRED EMBODIMENT

Figure 1:
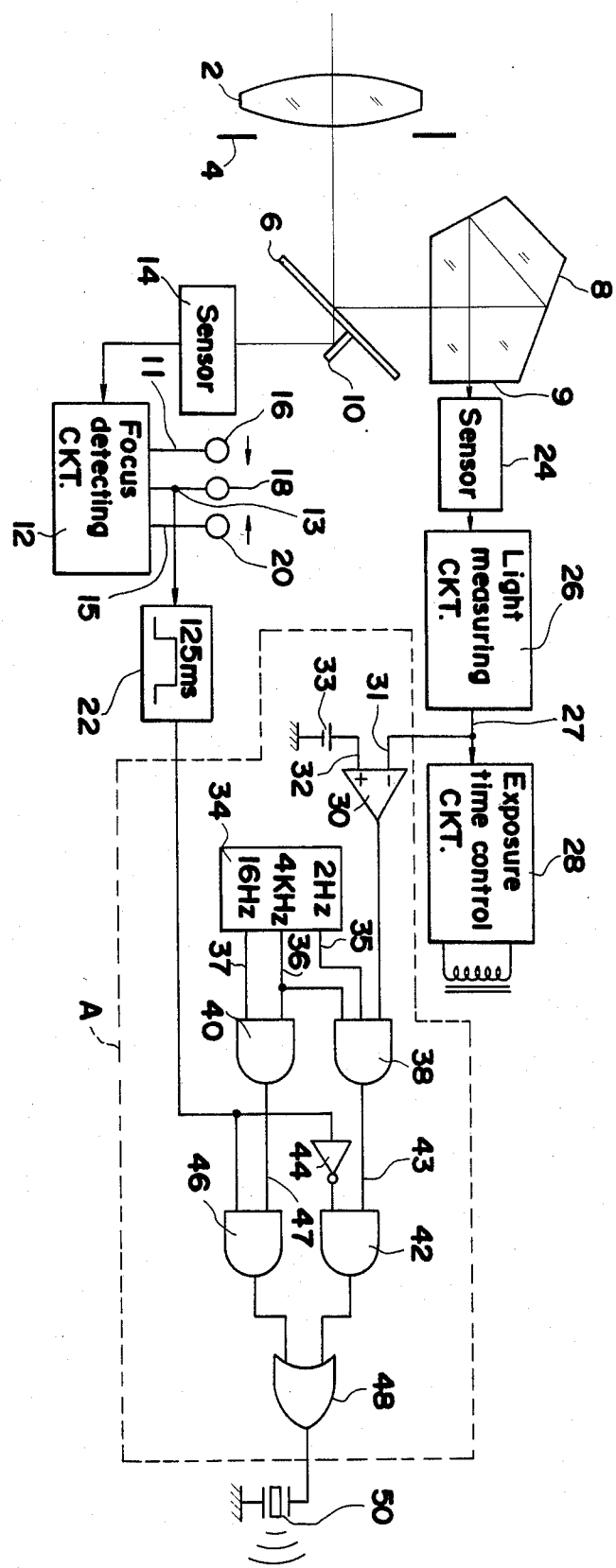
FIG. 1 is a block diagram showing an embodiment of the present invention.

With reference to FIG. 1, objective lens 2, diaphragm 4, reflex mirror 6 and pentagonal prism 8 together compose a conventional optical system for a single lens reflex camera. Reflex mirror 6 is semi-transparent at its central portion behind which auxiliary or sub mirror 10 is disposed. The light from a photographic object passes through objective lens 2, the aperture of diaphragm 4 and the semi-transparent portion of the reflex mirror 6 and is reflected by sub-mirror 10 to be directed to focus sensor 14 of focus detecting device 12. Focus detecting device 12 produces, from the outputs of focus sensor 14, data of the amount of displacement of an object image being formed, from a given focal plane on which the object image is expected to be formed. Focus detecting device 12 also determines, from the outputs of focus sensor 14, whether the object image is formed within the in-focus range (in-focus condition), in front of the focal place (front focus condition) or at the rear of the focal plane (rear focus condition). Then, focus detecting device 12 generates s "High" voltage signal at one of terminals 11, 13 and 15 in accordance with the displacement amount data and the determination of the focus condition. The focus detecting device 12 may be any of conventional devices in so far as they produce the signals as mentioned above. For example, the focus detecting device manufactured by Honeywell Inc. and known as TCL (Through the Camera Lens) element may be used for it. The basic form of TCL is disclosed in the U.S. Pat. No. 4,333,007. Visual indicator elements e.g. light emitting diodes or LEDs 16, 18 and 20 are connected with focus detecting device 12 and are disposed to be seen in the camera viewfinder by the user so that they indicates respectively the front focus, in-focus and rear focus condition in response to the output of focus detecting device 12. As such an indicating device is well-known in the art, detailed description thereof seems to be unnecessary here.

One-shot circuit 22 has its input terminal connected with output terminal 13 of focus detecting device 12 and designed to generate a gate pulse of a given duration in response to a "High" voltage signal that represents an in-focus condition and is fed from terminal 13. As will be described later, warning of blur occuring object brightness is interrupted and the in-focus condition is indicated while the gate signal is being generated. The duration of the gate signal is set to be shorter than half the period of the intermittence of the blur warning. The gate signal is applied to AND gate 46 and is also supplied to AND gate 42 through inverter 44. Accordingly, while one-shot circuit 22 is producing the gate pulse in response to the attainment of an in-focus condition, AND gate 42 inhibits the passage of a "High" voltage signal applied to other input terminal 43 thereof, while AND gate 46 allows passage of a "High" voltage signal applied to other input terminal 47 thereof. The signals supplied to input terminals 43 and 47 of AND gate 42 and 46 are for making sounds for the blur warning and in-focus indication respectively and detail description thereof will be made later. The signal having passed through AND gate 42 or 46 is applied through OR gate 48 to acoustic means or sound generator 50 including a piezoelectric element or the like.

Light measuring circuit 26 includes a photoelectric element 24 and has a conventional construction to produce a voltage signal representative of an exposure time suitable for the measured object brightness, a preset diaphragm aperture value and a set film sensitivity. When shutter release operation is performed, known exposure time control circuit 28 controls camera exposure time in accordance with the output of light measuring circuit 26. Output terminal 27 of light measuring circuit 26 is connected with inverting input terminal 31 of voltage comparator 30 which in turn compares the output voltage of light measuring circuit 26 with the voltage of reference voltage source 33, the latter voltage corresponding to the blur occuring critical or shortest limit shutter speed, e.g. 1/60 second. Voltage comparator 30 detects by that comparison whether the object brightness is within or outside the blur occuring range and generates a "High" voltage signal when the object brightness is within the low brightness range requiring blur occuring shutter speed. The "High" voltage signal from comparator 30 is fed to one of the input terminals of AND gate 38.

Figure 2:
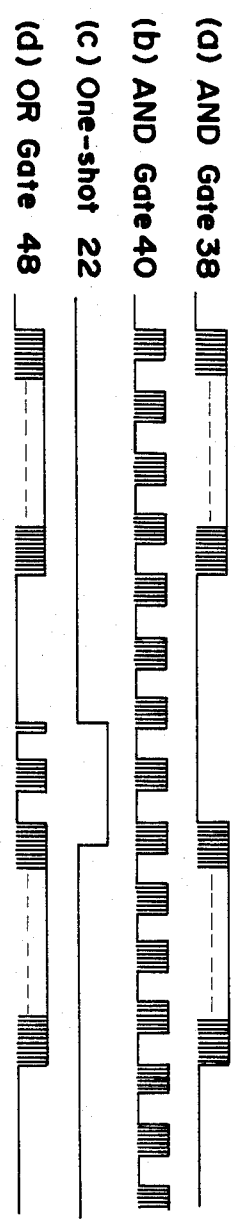
FIG. 2 is a time chart for illustrating the operation of the embodiment shown in FIG. 1.
Figure 3:
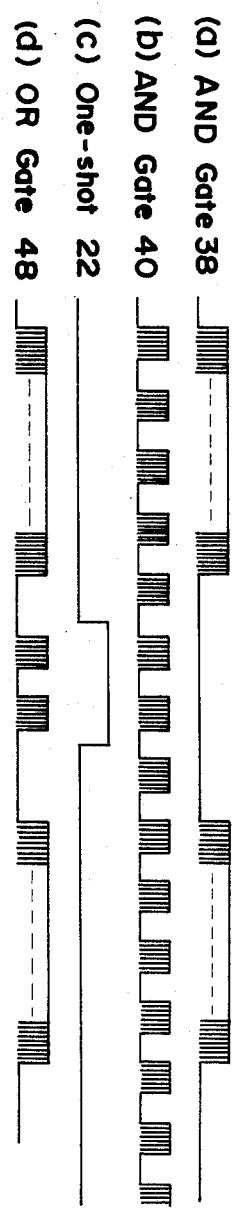
FIG. 3 is a time chart for illustrating the operation of the same embodiment but different in the timings of signal from that shown in FIG. 2.

An oscillator 34 successively or sequentially generates pulses of, for example, 2 Hz, 4 kHz and 16 Hz, respectively, from terminals 35, 36 and 37. The pulses of 4 kHz are used to drive the acoustic means 50 to make a sound belonging to relatively high audible frequencies. The pulses of 2 Hz are used for the control of intermittence of the blur warning sound, while the pulses of 16 Hz are used for the control of the generation of in-focus condition indicating sound. The frequencies of the pulses for the blur warning and the in-focus indication are not limited to the above described 2 Hz and 16 Hz, but may have any values, as explained later, in so far as they enable the user to distinguish between the blur warning and the in-focus indicattion. For example, the blur warning may be indicated continuously, i.e. the frequency for the blur warning sound may be zero Hz. The other two input terminals of AND gate 38 receive, respectively, the pulses of 2 Hz and 4 kHz from output terminals 35 and 36 of pulse generator 34. Thus, when comparator 30 generates a "High" voltage signal, AND gate 38 generates a signal of the form wherein a pause of 250 milliseconds follows each generation of pulses of 4 kHz for 250 milliseconds as shown in FIG. 2(a). On the other hand, AND gate 40 receives, at its two input terminals, pulses of 4 kHz and 16 Hz from output terminals 36 and 37 of oscillator 34, to generate signals of the form wherein a pause of 31.25 milliseconds follows each generation of pulses of 4 kHz for 31.25 milliseconds. If the duration of a gate pulse from one-shot circuit 22 is set to be the double of the duration of the pulse of 16 Hz, i.e. to be 125 milliseconds, AND gate 46 generates pulses of 4 kHz two times for 31.25 milliseconds at each time with a pause of 31.25 milliseconds between the generations as shown in FIG. 2(d) when a gate pulse as shown in FIG. 2(c) is being generated. It is to be understood that the generation of the gate pulse by one-shot circuit 22 is not synchronized with the generation of pulses of 16 Hz by oscillator 34 and the pulses of 16 Hz are not always generated in the perfect forms during the generation of the gate pulse, as shown in FIG. 2(d). Namely, it can possibly occur that the gate pulse begins to be generated while the pulse of 16 Hz is being generated, as shown in FIG. 3(c). If it is desired that the signals are always generated as shown in FIG. 2, another AND gate may be provided between focus detecting device 12 and one-shot circuit 22 such that two input terminals of the additional AND gate are connected with terminal 13 of focus detecting device 12 and terminal 37 of pulse generator 34, respectively, to actuate one-shot circuit 22 when both input terminals of the additional AND gate receive "High" voltage signals. Anyway, in the present invention, it is important that a pulse sound for the in-focus indication with short time break can be heard momentarily and impressively. It may be easily understood by those skilled in the art that the above described embodiment may be modified such that AND gates 38 and 42 and AND gates 40 and 46 are respectively composed of a single AND gate or that the output terminal of vaoltage comparator 30 is connected with the input terminal of AND gate 42.

Nextly, the general operation of the acoustic indicating device with the construction as described above will now be explained. When a shutter release button (not shown) is depressed halfway, electric power will be supplied to the entire circuit so that focus detecting circuit 12 and light measuring circuit 26 are brough into operating conditions respectively. Light measuring circuit 26 may be arranged such that the power supply thereto is maintained for a given period once it begin to be supplied with the power. At the power supply condition, one of the front focus, in-focus and rear focus conditions that was detected by focus detecting device 12 is indicated by one of indicator elements 16, 18 and 20 within the view finder. The user may manually adjust a focus adjusting member (not shown) of objective lens 2 in accordance with (or with reference to) the visual indication so that an image of a photographic object moves towards the in-focus range. In case the photographic object has enough brightness that is outside of the blur occuring range, upon attainment of an in-focus condition, in-focus indicating sounds of the frequency of 16 Hz are generated pulsatively, for example, twice for the period of a gate pulse being generated by one-shot circuit 22. If the brightness of a photographic object is within the blur occuring range, intermittent sound of 2 Hz of which period is comparatively longer than the period of the in-focus indicating sound is sequentially or successively generated to warn the possibility of blurred picture. If an in-focus condition has been attained by the manual focusing operation by the user under the blur warned condition, the indication of blur warning is interrupted for a period of a gate pulse being generated, in response to the in-focus condition attainment, and the above mentioned in-focus indicating sound of comparatively short period or interval is produced within the period of the duration of the gate pulse. The intermittent sound for the indication of an in-focus condition, has relatively short interval in comparison with the blur warning sound and enable the user to know clearly the attainment of in-focus condition even during the blur warning. It is to be noted that the components of the acoustic indicating device are not limited to the combination of the one-shot circuit, comparator, AND gate and so on enclosed by a broken line A in FIG. 1, but the device may be instead provided with a microprocessor, a CPU or the like with the microprocessor being programmed to carry on the above mentioned operations. In particular, as conventional focus detecting devices are generally designed such that a microprocessor controls the operation of the device, the microprocessor may as well be programmed to perform the operation for the acoustic indication of the present invention. Although the height (frequency) of the sound was 4 kHz both for the blur warning and the in-focus indication in the above embodiment, the height of the sound may differ with the kinds of indication. Further, whatever frequency may be selected for driving acoustic means 50 so long as acoustic means 50 is effectively driven and can make audible sound. The periods of the ON state and OFF state of the intermittent sound for the blur warning may not be necessarily exactly the same but may be approximately the same.

As many apparently widely different embodiments of this invention may be made without departing from the spirit and scope thereof, it is to be understood that the invention is not limited to the specific embodiments thereof except as defined in the appended claims.

What is claimed is:

1. An acoustic indicating device for cameras in which an exposure time is automatically controlled in accordance with a measured object brightness and which has an objective lens, said device comprising:

a first signal generating means for generating a first signal of a first frequency when an anticipated exposure time to be controlled automatically is longer than a given value;

a focus condition detecting means for generating an in-focus signal when an in-focus condition is obtained with the camera objective lens;

a second signal generating means responsive to said in-focus signal for generating, for a given time period, a second signal of a second frequency, which is higher than said first frequency;

an acoustic means, responsive to said first and second signals, for generating an audible sound intermittently at said first and second frequencies, respectively; and means for interrupting, for said given time period, the supply of said first signal to said acoustic means in response to the generation of said in-focus signal.

2. The acoustic indication device according to claim 1 wherein said given time period of the interruption is longer than a period of the intermittence of the sound generation at said second frequency.

3. The acoustic indicating device according to claim 2 wherein said focus condition detecting means includes means for determining whether or not an object image formed by said objective lens is within an in-focus range and generating said in-focus signal when the image object falls within the in-focus range.

4. The acoustic indicating device according to claim 2 wherein said device further comprising a control means for controlling the sequential operations of said first and second signal generating means, said focus condition detecting means, and said means for interrupting.

5. The acoustic indicating device according to claim 4 wherein said control means includes a microprocessor.

6. The acoustic indicating device according to claim 2 wherein said second signal generating means includes a pulse generator responsive to said in-focus signal for generating a pulse of a duration commensurate with said given time period and actuating said means for interrupting for the duration, the duration of said pulse being shorter than a half period of the intermittence of the sound generation at said first frequency.

7. The device according to claim 6 wherein said means for interrupting includes an AND gate connected between said first signal generating means and said acoustic means, and means for blocking said AND gate during the generation of said pulse.

8. The device according to claim 6 wherein said first and second signals are rectangular wave signals.

9. The device according to claim 8 wherein said first and second frequencies are 2 Hz and 16 Hz, respectively.

* * * * *